(12) United States Patent
Fan

(10) Patent No.: US 11,543,741 B2
(45) Date of Patent: Jan. 3, 2023

(54) ILLUMINATION SYSTEM AND PROJECTION DEVICE

(71) Applicant: Coretronic Corporation, Hsin-Chu (TW)

(72) Inventor: Chen-Wei Fan, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/471,162

(22) Filed: Sep. 10, 2021

(65) Prior Publication Data
US 2022/0091495 A1 Mar. 24, 2022

(30) Foreign Application Priority Data
Sep. 18, 2020 (CN) .......................... 202010985720.3

(51) Int. Cl.
*G03B 21/20* (2006.01)
*G02B 27/28* (2006.01)

(52) U.S. Cl.
CPC ......... *G03B 21/204* (2013.01); *G02B 27/283* (2013.01); *G03B 21/208* (2013.01); *G03B 21/2066* (2013.01); *G03B 21/2073* (2013.01); *G03B 21/2013* (2013.01)

(58) Field of Classification Search
CPC .............. G03B 21/204; G03B 21/2066; G03B 21/2073; G03B 21/208; G02B 27/283
See application file for complete search history.

(56) References Cited

U.S. PATENT DOCUMENTS

| | | | |
|---|---|---|---|
| 2012/0127435 A1 | 5/2012 | Kitano et al. | |
| 2012/0242912 A1* | 9/2012 | Kitano | F21V 9/08 362/19 |
| 2013/0088471 A1* | 4/2013 | Kitano | G02B 27/1026 345/208 |
| 2014/0226306 A1* | 8/2014 | Khan | H04N 9/3158 362/84 |

(Continued)

FOREIGN PATENT DOCUMENTS

CN 109557750 4/2019

OTHER PUBLICATIONS

"Search Report of Europe Counterpart Application", dated Feb. 11, 2022, p. 1-p. 6.

*Primary Examiner* — Bao-Luan Q Le
(74) *Attorney, Agent, or Firm* — JCIPRNET

(57) ABSTRACT

An illumination system, including a light source, a reflective optical element, a polarization conversion element, a beam splitting element, and a homogenizing element, is provided. The light source provides a first light beam having a first polarization state and a second light beam having a second polarization state. The reflective optical element is disposed on a transmission path of the first light beam and the second light beam. The polarization conversion element is disposed between the light source and the reflective optical element. The beam splitting element is disposed between the light source and the polarization conversion element. The beam splitting element includes at least one first region and at least one second region. The homogenizing element is disposed on a transmission path of a light beam reflected by the beam splitting element. A projection device having the illumination system is also provided.

20 Claims, 7 Drawing Sheets

(56) References Cited

U.S. PATENT DOCUMENTS

| | | | |
|---|---|---|---|
| 2015/0098065 A1* | 4/2015 | Tanaka | G03B 21/2013 |
| | | | 353/84 |
| 2015/0267880 A1 | 9/2015 | Hadrath et al. | |
| 2016/0238923 A1 | 8/2016 | Tanaka et al. | |
| 2017/0082912 A1* | 3/2017 | Wakabayashi | G03B 21/2013 |
| 2017/0097560 A1* | 4/2017 | Matsubara | H04N 9/3111 |
| 2017/0205694 A1* | 7/2017 | Zakoji | H04N 9/3111 |
| 2017/0289511 A1* | 10/2017 | Usami | G03B 33/08 |
| 2017/0347075 A1* | 11/2017 | Okuda | H04N 9/3102 |
| 2018/0129127 A1* | 5/2018 | Wakabayashi | H04N 9/3114 |
| 2018/0217486 A1* | 8/2018 | Tanaka | G03B 21/28 |
| 2018/0252992 A1* | 9/2018 | Akiyama | G03B 21/204 |
| 2018/0299757 A1* | 10/2018 | Liao | G03B 21/204 |
| 2019/0094672 A1 | 3/2019 | Akiyama | |
| 2019/0199981 A1* | 6/2019 | Murakami | H04N 9/3182 |
| 2020/0159101 A1 | 5/2020 | Fan et al. | |
| 2020/0285138 A1* | 9/2020 | Kurata | G03B 21/2066 |
| 2020/0401026 A1* | 12/2020 | Akiyama | G03B 21/204 |
| 2020/0401032 A1* | 12/2020 | Akiyama | G03B 21/2066 |
| 2022/0026788 A1* | 1/2022 | Akiyama | G03B 21/2066 |
| 2022/0171268 A1* | 6/2022 | Hirakawa | G02B 27/1066 |
| 2022/0334458 A1* | 10/2022 | Lin | G02B 5/3083 |

\* cited by examiner

ILLUMINATION SYSTEM AND PROJECTION DEVICE

CROSS-REFERENCE TO RELATED APPLICATION

This application claims the priority benefit of China application serial no. 202010985720.3, filed on Sep. 18, 2020. The entirety of the above-mentioned patent application is hereby incorporated by reference herein and made a part of this specification.

BACKGROUND

Technical Field

This disclosure relates to an optical system and an electronic device, and in particular to an illumination system and a projection device.

Description of Related Art

A projection device is a display device for generating a large-scale image, and it has been continuously improving with the evolution and innovation of technology. The imaging principle of the projection device is to convert an illuminating beam generated by an illumination system into an imaging beam through a light valve, and then project the imaging beam onto a projection target (such as a screen or a wall) through a projection lens to form a projection image.

In addition, with requirements for brightness, color saturation, service life, and non-toxicity environmental impact of projection devices by the market, the illumination system has evolved from using light sources such as an ultra-high-performance lamp (UHP lamp) and a light-emitting diode (LED) to the currently most advanced laser diode (LD). However, in a current optical system, a light beam generated by a blue laser diode is prone to excessive and non-uniform energy.

The information disclosed in this background section is only for enhancement of understanding of the background of the described technology and therefore it may contain information that does not form the prior art that is already known to a person of ordinary skill in the art. Furthermore, the information disclosed in this section does not mean that one or more problems to be resolved by one or more embodiments of the disclosure were acknowledged by a person of ordinary skill in the art.

SUMMARY

This disclosure provides an illumination system and a projection device, which can reduce a system volume and improve uniformity of an illuminating beam.

Other objectives and advantages of the disclosure may be further understood from the technical features disclosed in the disclosure.

In order to achieve one, some, or all of the above objectives or other objectives, the disclosure provides an illumination system, which includes a light source, a reflective optical element, a polarization conversion element, a beam splitting element, and a homogenizing element. The light source provides a first light beam having a first polarization state and a second light beam having a second polarization state. The reflective optical element is disposed on a transmission path of the first light beam and the second light beam. The polarization conversion element is disposed between the light source and the reflective optical element, and is configured to convert the first light beam having the first polarization state to the first light beam having the second polarization state, and to convert the second light beam having the second polarization state to the second light beam having the first polarization state. The beam splitting element is disposed between the light source and the polarization conversion element. The beam splitting element includes at least one first region and at least one second region. The first region is configured to allow a light beam having the first polarization state to pass through and reflect a light beam having the second polarization state. The second region is configured to allow the light beam having the second polarization state to pass through and reflect the light beam having the first polarization state. The homogenizing element is disposed on a transmission path of a light beam reflected by the beam splitting element.

In order to achieve one, some, or all of the above objectives or other objectives, the disclosure further provides a projection device, which includes an illumination system, at least one light valve, and a projection lens. The illumination system is configured to provide an illuminating beam. The illumination system includes a light source, a reflective optical element, a polarization conversion element, a beam splitting element, and a homogenizing element. The light source provides a first light beam having a first polarization state and a second light beam having a second polarization state. The reflective optical element is disposed on a transmission path of the first light beam and the second light beam, and is configured to reflect the first light beam and the second light beam. The polarization conversion element is disposed between the light source and the reflective optical element, and is configured to convert the first light beam having the first polarization state to the first light beam having the second polarization state, and to convert the second light beam having the second polarization state to the second light beam having the first polarization state. The beam splitting element is disposed between the light source and the polarization conversion element. The beam splitting element includes at least one first region and at least one second region. The first region is configured to allow a light beam having the first polarization state to pass through and reflect a light beam having the second polarization state. The second region is configured to allow the light beam having the second polarization state to pass through and reflect the light beam having the first polarization state. The homogenizing element is disposed on a transmission path of a light beam reflected by the beam splitting element. The light valve is disposed on a transmission path of the illuminating beam and is configured to convert the illuminating beam into an imaging beam. The projection lens is disposed on a transmission path of the imaging beam and is configured to project the imaging beam out of the projection device.

Based on the above, in the illumination system and the projection device of the disclosure, the light beam provided by the light source of the illumination system may be enabled to change its polarization state during transmission by passing through the polarization conversion element and by being reflected by the reflective optical element, and the transmission path is changed by the beam splitting function of the beam splitting element, so as to be transmitted to the homogenizing element. In this way, the number of system components can be reduced, thereby reducing the system volume, and improving the uniformity of the illuminating beam.

Other objectives, features and advantages of the disclosure can be further understood from the further technological features disclosed by the embodiments of the disclosure wherein there are shown and described preferred embodiments of the disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the descriptions, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top", "bottom", "front", "back" etc., is used with reference to the orientation of the figure(s) being described. The components of the disclosure can be positioned in a number of different orientations. As such, the directional terminology is used for purposes of illustration and is in no way limiting.

On the other hand, the drawings are only schematic and the size of the components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting.

The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings.

Similarly, the terms "facing", "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
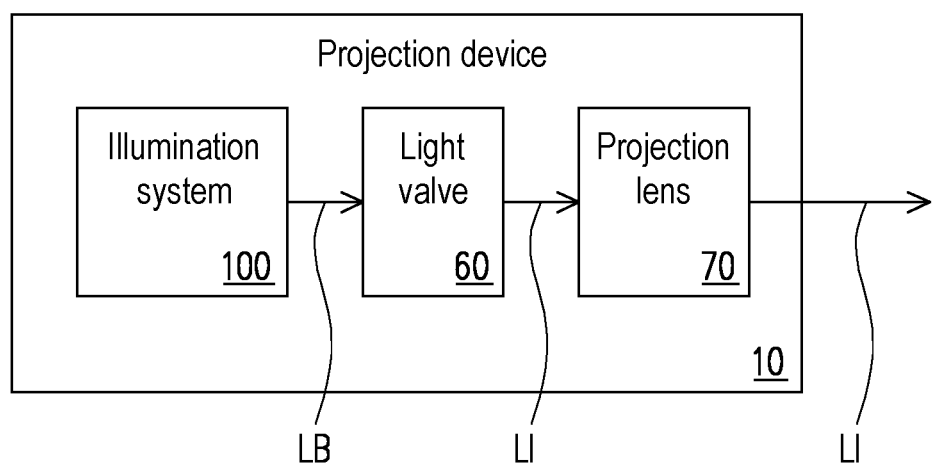
FIG. 1 is a schematic diagram of a projection device according to an embodiment of the disclosure.

FIG. 1 is a schematic diagram of a projection device according to an embodiment of the disclosure. With reference to FIG. 1, the embodiment provides a projection device 10, including an illumination system 100, at least one light valve 60 and a projection lens 70. The illumination system 100 is configured to provide an illuminating beam LB. The at least one light valve 60 is disposed on a transmission path of the illuminating beam LB, and is configured to convert the illuminating beam LB to an imaging beam LI. The projection lens 70 is disposed on a transmission path of the imaging beam LI, and is configured to project the imaging beam LI out of the projection device 10 to a projection target (not shown), such as a screen or a wall.

The light valve 60 is, for example, a reflective optical modulator such as a liquid crystal on silicon panel (LCoS panel) or a digital micro-mirror device (DMD). In some embodiments, the light valve 60 may also be a transparent optical modulator such as a transparent liquid crystal panel, an electro-optical modulator, a magneto-optical modulator, or an acousto-optic modulator (AOM). The disclosure does not limit the form and type of the light valve 60. Sufficient teaching, suggestions and implementation descriptions of the detailed steps and implementation manners of a method for converting the illuminating beam LB to the imaging beam LI by the light valve 60 may be obtained from general knowledge in the technical field, therefore it will not be reiterated here. In the embodiment, the number of the light valve 60 is one. For example, the projection device 10 uses a single digital micro-mirror element, while in other embodiments, there may be multiple digital micro-mirror elements, but the disclosure is not limited thereto.

The projection lens 70 includes, for example, a combination of one or more optical lenses with refractive power. For example, including various combinations of non-planar lenses such as a biconcave lens, a biconvex lens, a meniscus lens, a convex-concave lens, a plano-convex lens, and a plano-concave lens. In an embodiment, the projection lens 70 may further include a flat optical lens to project the imaging beam LI from the light valve 60 to the projection target in a reflective manner. The disclosure does not limit the form and type of the projection lens 70.

Figure 2A:
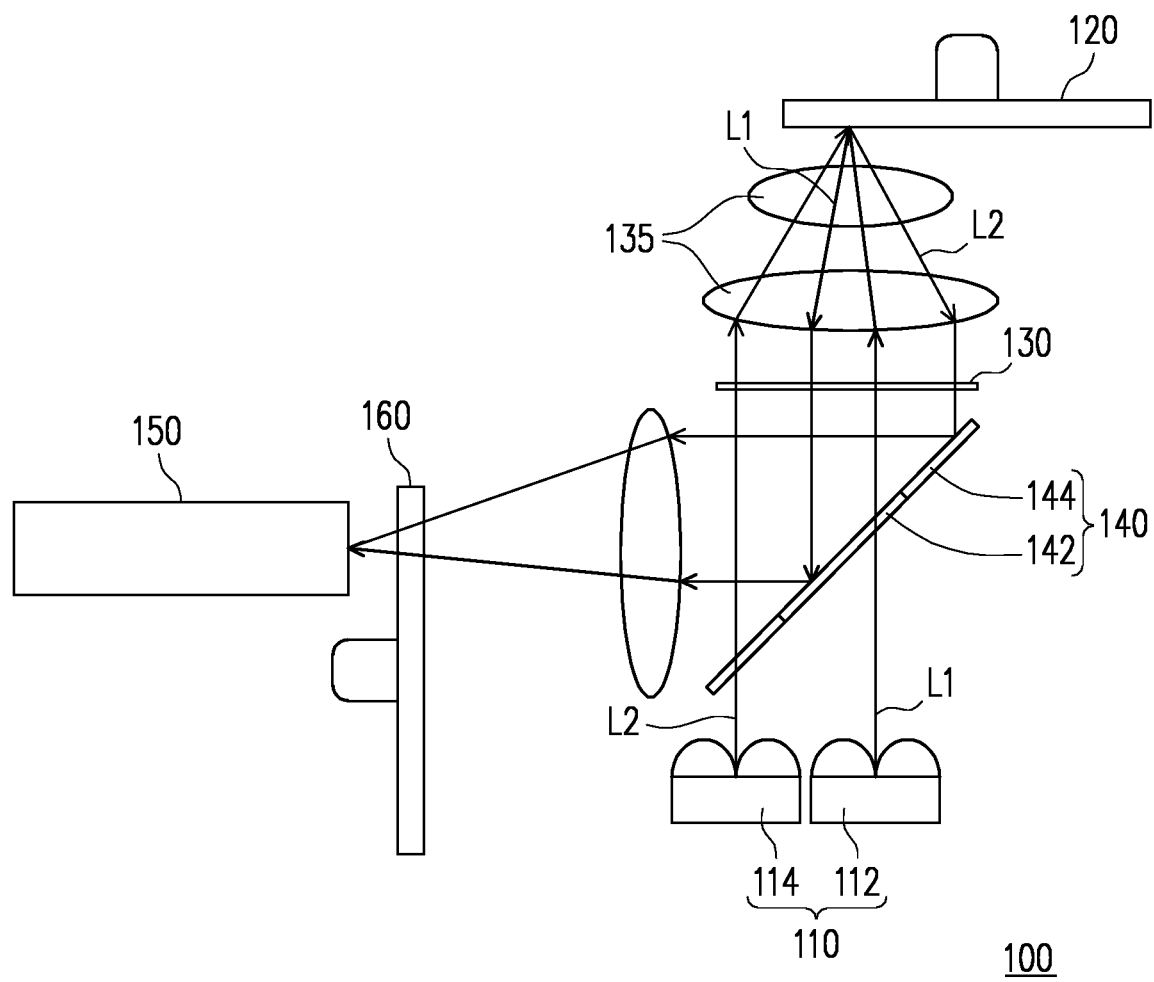
FIG. 2A and FIG. 2B are respectively schematic diagrams of an illumination system of the projection device according to an embodiment of the disclosure at different timings.
Figure 2B:
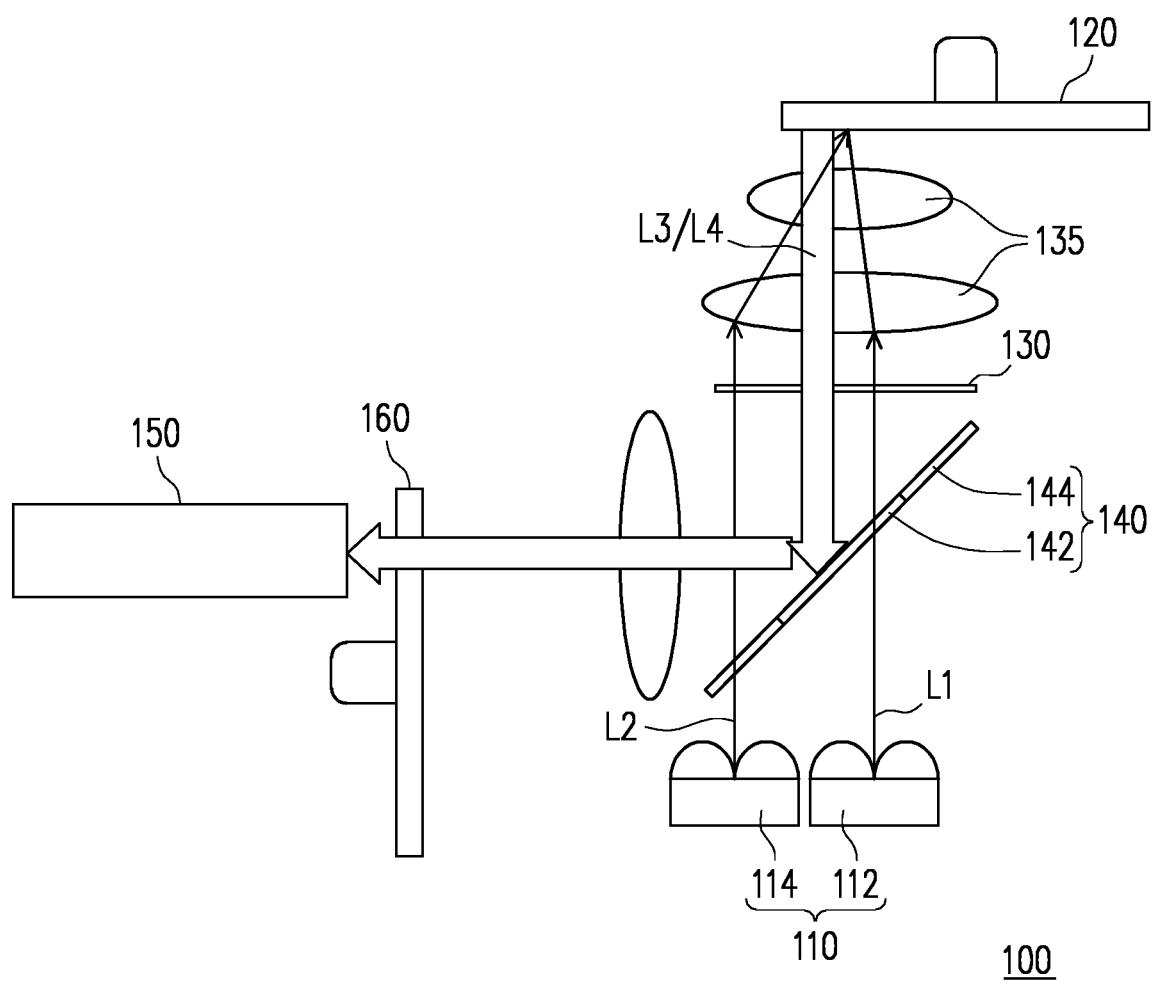

FIG. 2A and FIG. 2B are respectively schematic diagrams of an illumination system of the projection device according to an embodiment of the disclosure at different timings. With reference to FIGS. 2A and 2B, the illumination system 100 is configured to provide the illuminating beam LB. The illumination system 100 includes a light source 110, a reflective optical element 120, a polarization conversion element 130, a beam splitting element 140, and a homogenizing element 150. The homogenizing element 150 is configured to transmit the illuminating beam LB out of the illumination system 100. The light source 110 provides a first light beam L1 having a first polarization state and a second light beam L2 having a second polarization state. For example, the first polarization state is a linear polarization state such as a P polarization, and the second polarization state is a linear polarization state such as an S polarization. In detail, the light source 110 includes a first light-emitting element 112 and a second light-emitting element 114, which respectively provide the first light beam L1 and the second light beam L2. In the embodiment, the light source 110 is a blue laser diode, and wavelengths of the first light beam L1 and the second light beam L2 are the same, for example, both are 465 nm or 455 nm.

Figure 3:
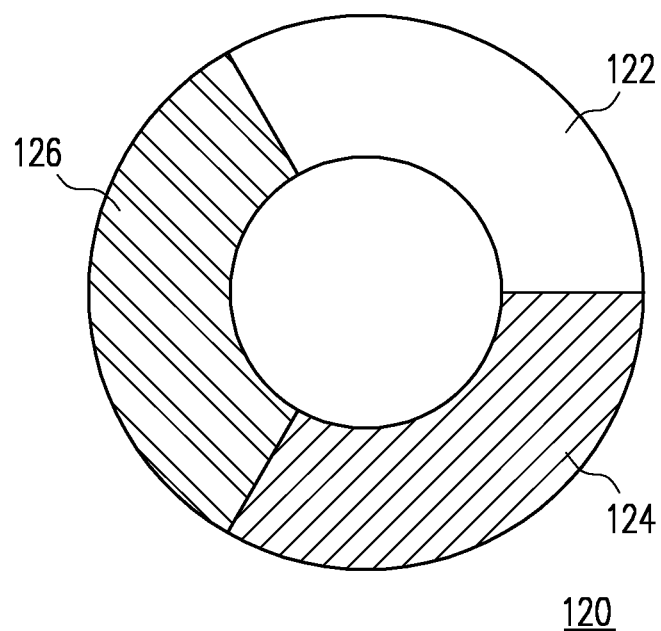
FIG. 3 is a schematic diagram of a reflective optical element in the illumination system of FIG. 2A.

FIG. 3 is a schematic diagram of a reflective optical element in the illumination system of FIG. 2A. With reference to FIGS. 2A, 2B and 3, the reflective optical element 120 is disposed on a transmission path of the first light beam L1 and the second light beam L2. In the embodiment, the reflective optical element 120 is a wavelength conversion element, such as a phosphor wheel, and has a reflection region 122, a first conversion region 124, and a second conversion region 126. In other embodiments, there may only be a single conversion region, and the disclosure is not limited thereto. The reflection region 122 is configured to reflect the first light beam L1 and the second light beam L2. For example, the reflection region 122 may carry out reflection through a reflective coating or a structure having a mirror surface. The first conversion region 124 is configured to convert the first light beam L1 and the second light beam L2 to a third light beam L3, and the second conversion region 126 is configured to convert the first light beam L1 and the second light beam L2 to a fourth light beam L4, as shown in FIG. 2B. For example, the first conversion region 124 and the second conversion region 126 are respectively, but not limited to, a phosphor that generates green light after being excited and a phosphor that generates orange light after being excited.

With reference to FIGS. 2A and 2B again, the polarization conversion element 130 is disposed between the light source 110 and the reflective optical element 120. By transmitting the first light beam L1 and the second light beam L2 back and forth through the polarization conversion element 130, the polarization conversion element 130 is configured to convert the first light beam L1 having the first polarization state to the first light beam L1 having the second polarization state, and the second light beam L2 having the second polarization state to the second light beam L2 having the first polarization state.

In detail, in the embodiment, the polarization conversion element 130 is a quarter-wave plate. Therefore, when the first light beam L1 and the second light beam L2 in the linear polarization state pass through the polarization conversion element 130 from the light source 110, the first light beam L1 and the second light beam L2 in the linear polarization state will be converted to be in circular polarization states in different directions, for example, a left-handed polarization state and a right-handed polarization state. When the first light beam L1 and the second light beam L2 in the circular polarization state are transmitted by the polarization conversion element 130 and reflected by the reflective optical element 120, the first light beam L1 and the second light beam L2 in the circular polarization state will be respectively converted to the circular polarization state in the other direction. For example, the left-handed polarization state is converted to the right-handed polarization state, and the right-handed polarization state is converted to the left-handed polarization state.

Finally, when the reflected first light beam L1 and the reflected second light beam L2 are transmitted through the polarization conversion element 130 again, the first light beam L1 having the first polarization state will be converted to the first light beam L1 having the second polarization state, and the second light beam L2 having the second polarization state will be converted to the second light beam L2 having the first polarization state.

Figure 4:
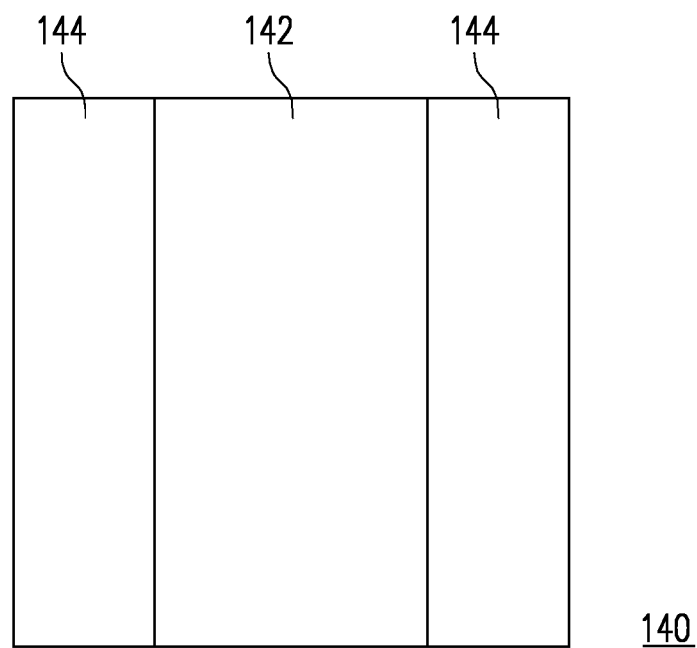
FIG. 4 is a schematic diagram of a beam splitting element in the illumination system of FIG. 2A.

FIG. 4 is a schematic diagram of a beam splitting element in the illumination system of FIG. 2A. With reference to FIGS. 2A, 2B and 4, the beam splitting element 140 is disposed between the light source 110 and the polarization conversion element 130. The beam splitting element 140 includes at least one first region 142 and at least one second region 144. The first region 142 is configured to allow a light beam having the first polarization state to pass through and reflect a light beam having the second polarization state. The second region 144 is configured to allow the light beam having the second polarization state to pass through and reflect the light beam having the first polarization state. In the embodiment, the number of the second region 144 is two, the number of the first region 142 is one, and the first region 142 is located between the two second regions 144. In addition, in the embodiment, the illumination system 100 further includes a focusing element 135, such as more than one optical lens, which is configured to allow a light beam passing through in an off-axis manner to be transmitted symmetrically during reflection. The so-called passing through in an off-axis manner means that the first light beam L1 and the second light beam L2 pass through the focusing element 135 from both sides of the optical axis of the focusing element 135, as shown in FIG. 2A. In another embodiment, the first region 142 has a penetration rate of more than 50% for the light beam of the first polarization state, and the second region 144 has a penetration rate of more than 50% for the light beam of the second polarization state.

Specifically, when the first light beam L1 having the first polarization state and the second light beam L2 having the second polarization state are respectively transmitted from the light source 110 to the beam splitting element 140, the first light beam L1 is transmitted through the first region 142, and the second light beam L2 is transmitted through the second region 144, as shown in FIG. 2A. When the first light beam L1 and the second light beam L2 are transmitted through the polarization conversion element 130 twice, it enables the first light beam L1 to have the second polarization state, and the second light beam L2 to have the first polarization state. Therefore, the first light beam L1 is transmitted to the first region 142 and is reflected to the homogenizing element 150 by the first region 142, and the second light beam L2 is transmitted to the second region 144 and is reflected to the homogenizing element 150 by the second region 144, as shown in FIG. 2A.

On the other hand, the first region 142 and the second region 144 of the beam splitting element 140 are configured to reflect the third light beam L3 and the fourth light beam L4. In the embodiment, the beam splitting element 140 is, for example, a dichroic mirror with green and orange reflector (DMGO). Therefore, when the first light beam L1 and the second light beam L2 are respectively converted to the third light beam L3 and the fourth light beam L4, the third light beam L3 and the fourth light beam L4 are transmitted to the beam splitting element 140 and are reflected to the homogenizing element 150 by the beam splitting element 140. In an embodiment, a wavelength range of the third light beam L3 and the fourth light beam L4 is, for example, between 490 nm and 590 nm. Therefore, the first region 142 and the second region 144 have a reflectivity of more than 90% for the third light beam L3 and the fourth light beam L4.

With reference to FIGS. 2A and 2B again. The homogenizing element 150 is disposed on the transmission path of the light beam reflected by the beam splitting element 140. The homogenizing element 150 is configured to adjust a spot shape of the light beam to enable the spot shape of the light beam to match a shape of a working region of the light valve (for example, rectangle), and enabling the spot to have a light intensity that is consistent or mutually close everywhere, so as to uniform the light intensity of the light beam. In the embodiment, the homogenizing element 150 is, for example, a glass light tunnel. However, in other embodiments, the homogenizing element 150 may also be other appropriate forms of optical elements, such as a lens array (for example, a fly eye lens array), and the disclosure is not limited thereto.

Therefore, in the illumination system 100 of the embodiment, the first light beam L1 and the second light beam L2 provided by the light source 110 may change the polarization state during transmission by passing back and forth through the polarization conversion element 130 and by being reflected by the reflective optical element 120, and the transmission path is changed by the beam splitting function of the beam splitting element 140. In this way, the system volume can be reduced and the uniformity of the illuminating beam LB can be improved.

Figure 5:
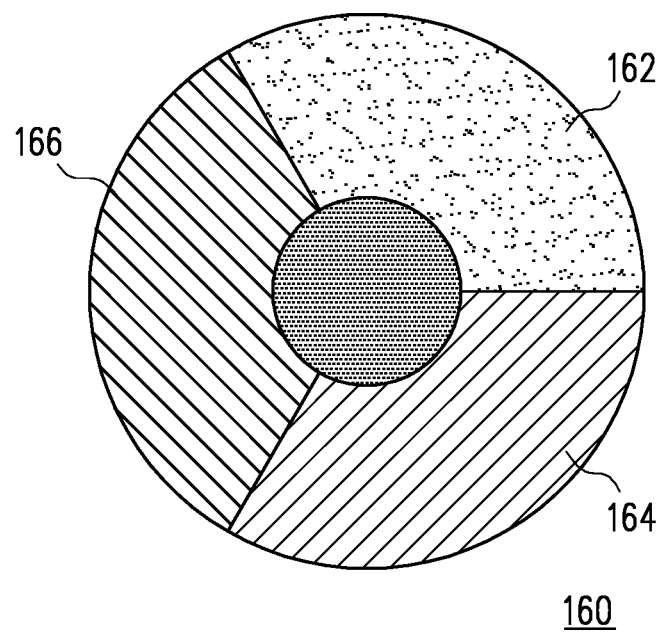
FIG. 5 is a schematic diagram of a filter element in the illumination system of FIG. 2A.

FIG. 5 is a schematic diagram of a filter element in the illumination system of FIG. 2A. With reference to FIGS. 2A, 2B and 5, in the embodiment, the illumination system 100 further includes a filter element 160, such as a filter wheel, which is disposed between the beam splitting element 140 and the homogenizing element 150. The filter element 160 is for allowing a light beam of a specific wavelength or within a specific wavelength range to pass through so as to form a monochromatic light. In detail, the filter element 160 includes a transparent region 162, a first filter region 164, and a second filter region 166. The transparent region 162 is configured to allow the first light beam L1 and the second light beam L2 to pass through. In other words, blue light will be provided to the homogenizing element 150 when the first light beam L1 and the second light beam L2 pass through the transparent region 162. In the embodiment, the transparent region 162 may also have a diffusion structure, which has a same effect as a diffusing sheet. In this way, the laser speckle phenomenon of the blue laser can be further reduced to improve the uniformity of the blue light.

On the other hand, the first filter region 164 is configured to allow a green light waveband of the third light beam L3 to pass through, and the second filter region 166 is configured to allow a red light band of the fourth light beam L4 to pass through. In other words, a green light is provided to the homogenizing element 150 when the third light beam L3 passes through the first filter region 164, and a red light is provided to the homogenizing element 150 when the fourth light beam L4 passes through the second filter region 166.

Figure 6:
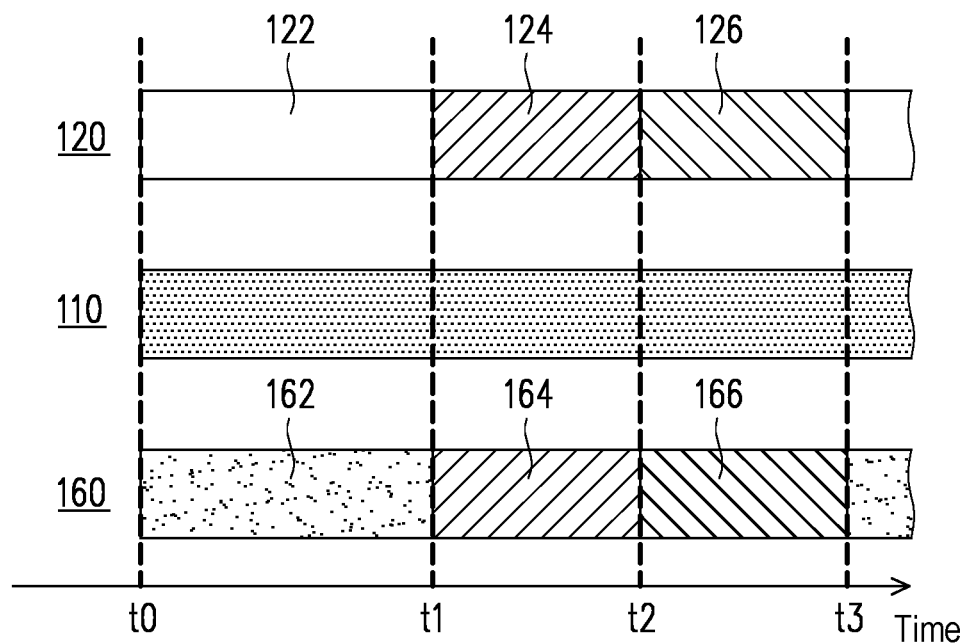
FIG. 6 is a timing schematic diagram of the illumination system of FIGS. 2A and 2B.

FIG. 6 is a timing schematic diagram of the illumination system of FIGS. 2A and 2B. With reference to FIGS. 2A, 2B, 3, 5, and 6, in the embodiment, both the reflective optical element 120 and the filter element 160 of the illumination system 100 are wheel devices, which enable different regions to enter the light beam illumination range at different timings, therefore allowing the illumination system 100 to provide light beams of different wavelengths at the different timings.

In detail, in the embodiment, the illumination system 100 has three timings during operation. In the first timing (that is, an interval between a time t0 and a time t1 as shown in FIG. 6), the light source 110 is in a switched-on state, and the first light beam L1 and the second light beam L2 are transmitted to the reflection region 122 of the reflective optical element 120 and the transparent region 162 of the filter element 160, enabling the illumination system 100 to provide a blue light beam in the first timing. In the second timing (that is, an interval between the time t1 and a time t2 as shown in FIG. 6), the light source 110 is in the switched-on state, the first light beam L1 and the second light beam L2 are transmitted to the first conversion region 124 of the reflective optical element 120 to form a green light beam, and the green light beam is transmitted to the first filter region 164 of the filter element 160, enabling the illumination system 100 to provide the green light beam in the second timing. In the third timing (that is, an interval between the time t2 and a time t3 as shown in FIG. 6), the light source 110 is in the switched-on state, the first light beam L1 and the second light beam L2 are transmitted to the second conversion region 126 of the reflective optical element 120 to form an orange light beam, and the orange light beam is transmitted to the second filter region 166 of the filter element 160, enabling the illumination system 100 to provide a red light beam in the third timing.

Figure 7:
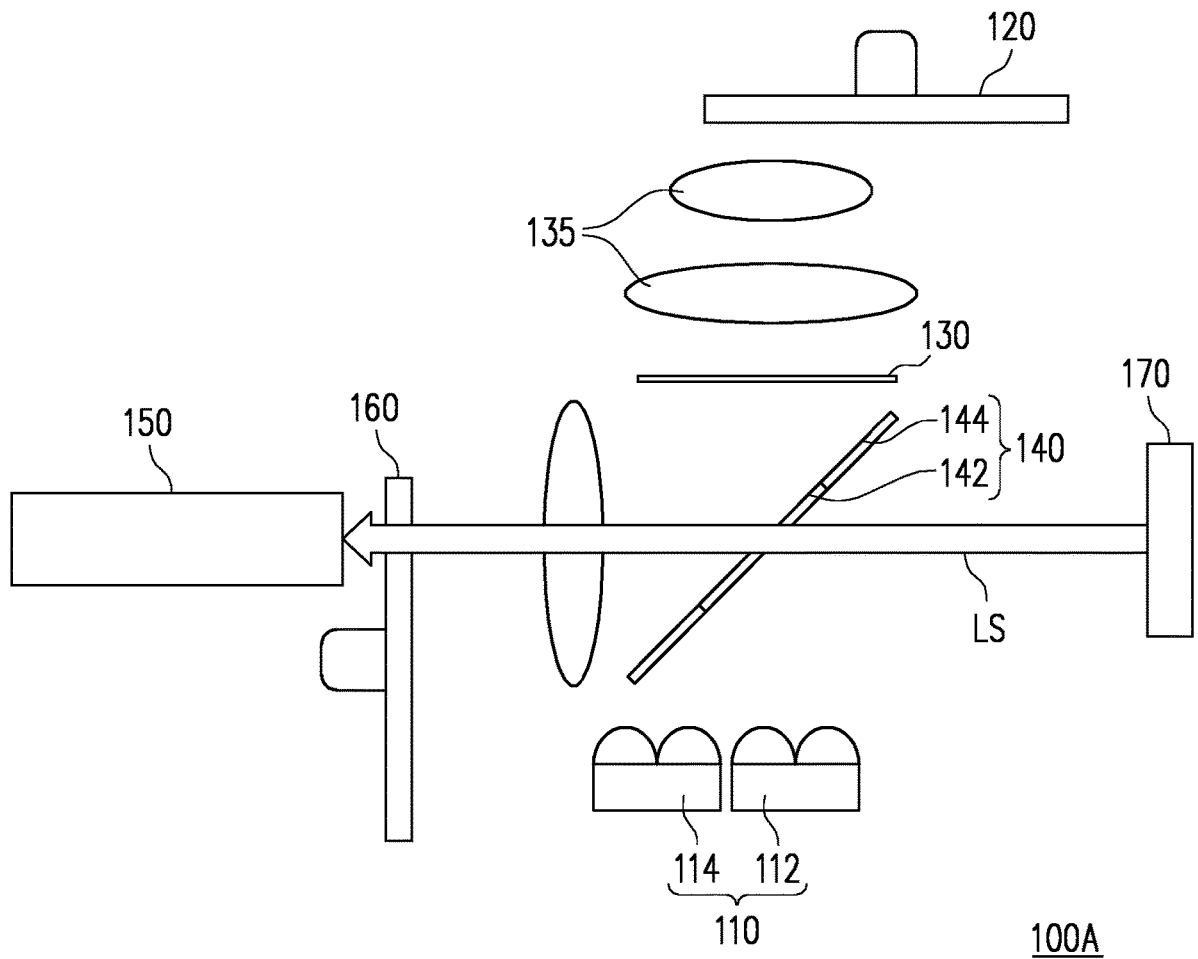
FIG. 7 is a schematic diagram of an illumination system according to another embodiment of the disclosure.

FIG. 7 is a schematic diagram of an illumination system according to another embodiment of the disclosure. With reference to FIG. 7, an illumination system 100A of FIG. 7 is similar to the illumination system 100 of FIG. 2A. The difference between the two is that, in this embodiment, the illumination system 100A further includes a supplementary light source 170 for providing a supplementary light beam LS. The first region 142 and the second region 144 of the beam splitting element 140 are configured to allow the supplementary light beam LS to pass through. Specifically, the supplementary light source 170 is a red laser diode. With reference to FIG. 6, in the embodiment, the supplementary light source 170 may be switched on at the third timing (in the interval between the time t2 and time t3 as shown in FIG. 6), while the light source 110 may be switched on or switched off at the third timing. In this way, the brightness of the red light of the illumination system 100A may be increased to increase the brightness of the illuminating beam. In an embodiment, a wavelength of the supplementary light beam LS is, for example, 625 nm, and the first region 142 and the second region 144 have a penetration rate of more than 90% for the supplementary light beam LS.

Figure 8:
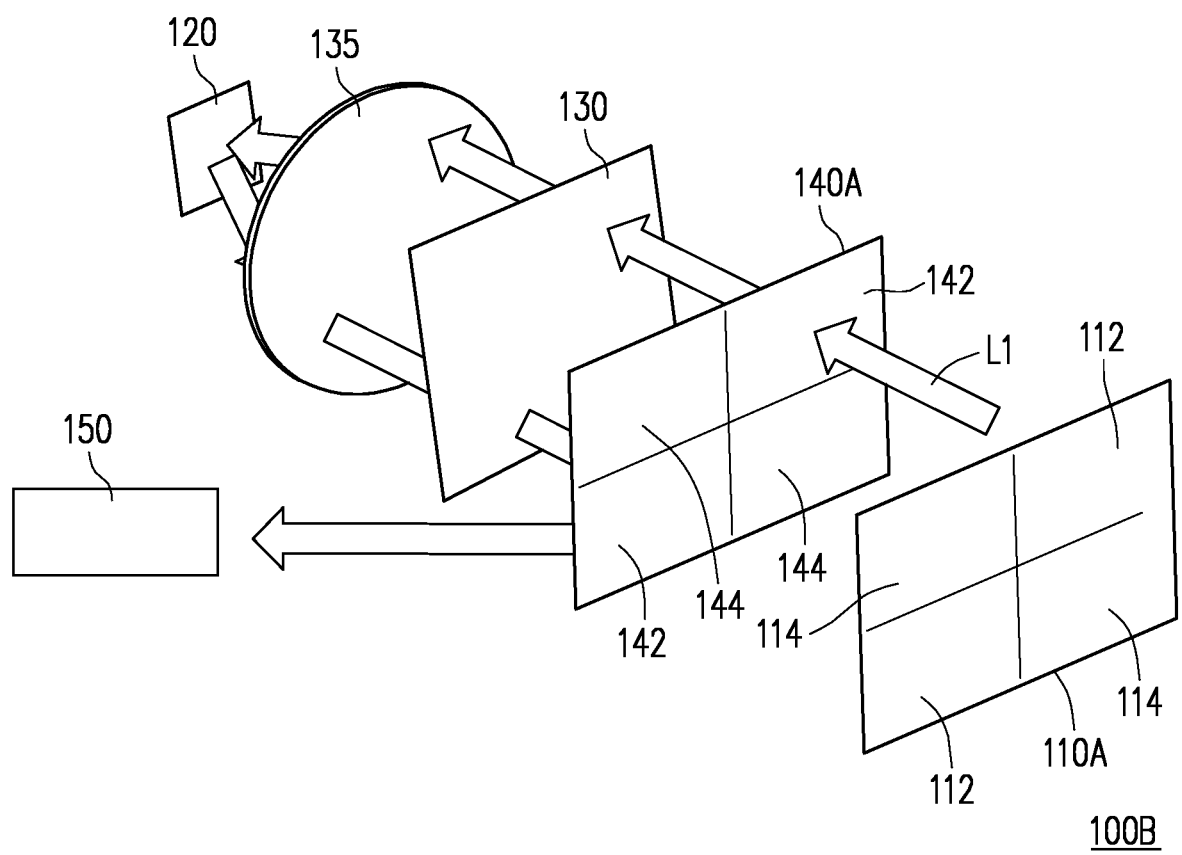
FIG. 8 is a schematic diagram of an illumination system according to yet another embodiment of the disclosure.

FIG. 8 is a schematic diagram of an illumination system according to yet another embodiment of the disclosure. With reference to FIG. 8, an illumination system 100B of this embodiment is similar to the illumination system 100 of FIG. 2A. The difference between the two is that, in this embodiment, a light source 110A of the illumination system 100B includes two first light-emitting elements 112 and two second light-emitting elements 114 staggered in an array. The two first light-emitting elements 112 provide the first light beam L1, and the two second light-emitting elements 114 provide the second light beam L2. In addition, in the embodiment, the first region 142 and the second region 144 of a beam splitting element 140A are distributed corresponding to the two first light-emitting elements 112 and the two second light-emitting elements 114 of the light source 110A. In other words, the numbers of the first region 142 and the second region 144 of the beam splitting element 140A are also two each, and they are staggered in an array, as shown in FIG. 8.

To make it more comprehensible, FIG. 8 only shows the transmission path of the first light beam L1. The first light beam L1 is transmitted toward and passed through the first region 142, and the second light beam L2 is transmitted toward and passed through the second region 144. After the reflective function of the reflective optical element 120, the first light beam L1 and the second light beam L2 are respectively transmitted to the second region 144 and the first region 142 symmetrically through the function of the focusing element 135. Therefore, the first light beam L1 and the second light beam L2 will be reflected and transmitted to the homogenizing element 150 by the beam splitting element 140A. It is worth mentioning that the disclosure does not limit the arrangement of the light source 110A and the beam splitting element 140A. In different embodiments, they may also be linearly symmetrically staggered, and the disclosure is not limited thereto.

In summary, in the illumination system and the projection device of the disclosure, the light beam provided by the light source of the illumination system may be enabled to change its polarization state during transmission by passing through the polarization conversion element and by being reflected by the reflective optical element, and the transmission path is changed by the beam splitting function of the beam splitting element, so as to be transmitted to the homogenizing element. In this way, the number of system components can be reduced, thereby reducing the system volume, and improving the uniformity of the illuminating beam.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby enabling persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the terms "the invention", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given.

The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims.

Any advantages and benefits described may not apply to all embodiments of the disclosure. It should be appreciated that variations may be made in the embodiments described by persons skilled in the art without departing from the scope of the disclosure as defined by the following claims. Moreover, no element and component in the disclosure is intended to be dedicated to the public regardless of whether the element or component is explicitly recited in the following claims.

What is claimed is:

1. An illumination system, comprising a light source, a reflective optical element, a polarization conversion element, a beam splitting element, and a homogenizing element, wherein
    the light source provides a first light beam having a first polarization state and a second light beam having a second polarization state;
    the reflective optical element is disposed on a transmission path of the first light beam and the second light beam;
    the polarization conversion element is disposed between the light source and the reflective optical element, and is configured to convert the first light beam having the first polarization state to the first light beam having the second polarization state, and convert the second light beam having the second polarization state to the second light beam having the first polarization state;
    the beam splitting element is disposed between the light source and the polarization conversion element, and comprises at least one first region and at least one second region, the at least one first region is configured to allow a light beam having the first polarization state to pass through and reflect a light beam having the second polarization state, and the at least one second region is configured to allow the light beam having the second polarization state to pass through and reflect the light beam having the first polarization state; and
    the homogenizing element is disposed on a transmission path of a light beam reflected by the beam splitting element.

2. The illumination system according to claim 1, wherein the reflective optical element is a wavelength conversion element, the wavelength conversion element has a reflection region, a first conversion region, and a second conversion region, the reflection region is configured to reflect the first light beam and the second light beam, the first conversion region is configured to convert the first light beam and the second light beam to a third light beam, and the second conversion region is configured to convert the first light beam and the second light beam to a fourth light beam.

3. The illumination system according to claim 2, wherein the at least one first region and the at least one second region of the beam splitting element are configured to reflect the third light beam and the fourth light beam.

4. The illumination system according to claim 2, further comprising a filter element, wherein the filter element is disposed between the beam splitting element and the homogenizing element, and comprises a transparent region, a first filter region, and a second filter region, the transparent region is configured to allow the first light beam and the second light beam to pass through, the first filter region is configured to allow the third light beam to pass through, and the second filter region is configured to allow the fourth light beam to pass through.

5. The illumination system according to claim 4, wherein the transparent region has a diffusion structure.

6. The illumination system according to claim 1, wherein a wavelength of the first light beam is the same as a wavelength of the second light beam.

7. The illumination system according to claim 1, wherein the polarization conversion element is a quarter-wave plate.

8. The illumination system according to claim 1, further comprising a supplementary light source, which provides a supplementary light beam.

9. The illumination system according to claim 8, wherein the at least one first region and the at least one second region of the beam splitting element are configured to allow the supplementary light beam to pass through.

10. The illumination system according to claim 1, wherein the light source comprises two first light-emitting elements and two second light-emitting elements staggered in an array, the two first light-emitting elements provide the first light beam, the two second light-emitting elements provide the second light beam, numbers of the at least one first region and the at least one second region are two each, and the two at least one first regions and the two at least second regions are staggered in an array.

11. A projection device, comprising an illumination system, at least one light valve and a projection lens, wherein the illumination system is configured to provide an illuminating beam, and comprises
- a light source, a reflective optical element, a polarization conversion element, a beam splitting element, and a homogenizing element, wherein
- the light source provides a first light beam having a first polarization state and a second light beam having a second polarization state;
- the reflective optical element is disposed on a transmission path of the first light beam and the second light beam;
- the polarization conversion element is disposed between the light source and the reflective optical element, and is configured to convert the first light beam having the first polarization state to the first light beam having the second polarization state, and convert the second light beam having the second polarization state to the second light beam having the first polarization state;
- the beam splitting element is disposed between the light source and the polarization conversion element, and comprises at least one first region and at least one second region, the at least one first region is configured to allow a light beam having the first polarization state to pass through and reflect a light beam having the second polarization state, and the at least one second region is configured to allow the light beam having the second polarization state to pass through and reflect the light beam having the first polarization state; and
- the homogenizing element is disposed on a transmission path of a light beam reflected by the beam splitting element;
- the at least one light valve is disposed on a transmission path of the illuminating beam, and is configured to convert the illuminating beam to an imaging beam; and the projection lens is disposed on a transmission path of the imaging beam, and is configured to project the imaging beam out of the projection device.

12. The projection device according to claim 11, wherein the reflective optical element is a wavelength conversion element, the wavelength conversion element has a reflection region, a first conversion region, and a second conversion region, the reflection region is configured to reflect the first light beam and the second light beam, the first conversion region is configured to convert the first light beam and the second light beam to a third light beam, and the second conversion region is configured to convert the first light beam and the second light beam to a fourth light beam.

13. The projection device according to claim 12, wherein the at least one first region and the at least one second region of the beam splitting element are configured to reflect the third light beam and the fourth light beam.

14. The projection device according to claim 12, further comprising a filter element, wherein the filter element is disposed between the beam splitting element and the homogenizing element, and comprises a transparent region, a first filter region, and a second filter region, the transparent region is configured to allow the first light beam and the second light beam to pass through, the first filter region is configured to allow the third light beam to pass through, and the second filter region is configured to allow the fourth light beam to pass through.

15. The projection device according to claim 14, wherein the transparent region has a diffusion structure.

16. The projection device according to claim 11, wherein a wavelength of the first light beam is the same as a wavelength of the second light beam.

17. The projection device according to claim 11, wherein the polarization conversion element is a quarter-wave plate.

18. The projection device according to claim 11, further comprising a supplementary light source, which provides a supplementary light beam.

19. The projection device according to claim 18, wherein the at least one first region and the at least one second region of the beam splitting element are configured to allow the supplementary light beam to pass through.

20. The projection device according to claim 11, wherein the light source comprises two first light-emitting elements and two second light-emitting elements staggered in an array, the two first light-emitting elements provide the first light beam, the two second light-emitting elements provide the second light beam, numbers of the at least one first region and the at least one second region are two each, and the two at least one first regions and the two at least second regions are staggered in an array.

* * * * *